Aug. 4, 1931.  A. I. MARCUM  1,816,981
DRIVING AND TORQUING ARRANGEMENT FOR ROAD VEHICLES
Filed June 26, 1926
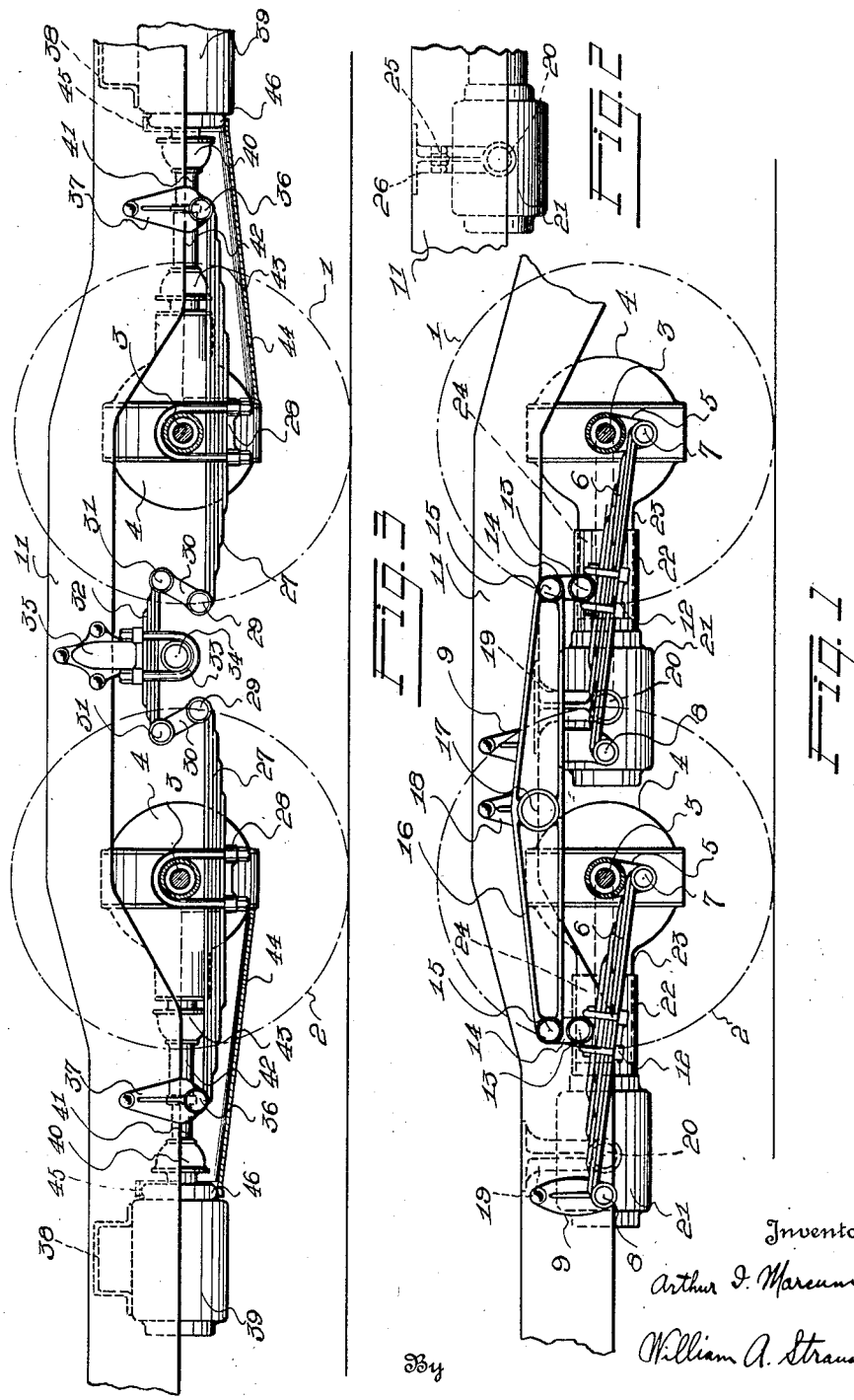
Inventor
Arthur I. Marcum
William A. Strauch
By
Attorney Patented Aug. 4, 1931

1,816,981

UNITED STATES PATENT OFFICE

ARTHUR I. MARCUM, OF OAKLAND, CALIFORNIA, ASSIGNOR, BY MESNE ASSIGNMENTS, TO AUTOMOTIVE ENGINEERING CORPORATION, A CORPORATION OF DELAWARE

DRIVING AND TORQUING ARRANGEMENT FOR ROAD VEHICLES

Application filed June 26, 1926. Serial No. 118,654.

The present invention relates to drive and torquing arrangements for road vehicles and more particularly relates to electrical drive arrangements for road vehicles with one or more drive axles.

In ordinary four wheel electrically driven automobiles it has been the practice to drive the axles from the motor supported from the frame through splined or telescopic propeller shaft sections provided with universal joints and the torque reactions of the axle are resisted by the body supporting springs which are rigidly secured to the axles. In this type of vehicle the total axle movement with relation to the motor is only that which is permitted by the deflection of the springs and the movement permitted by the universal joints or flexible couplings in the propeller shaft absorbs most of the movement of the axle with relation to the motor so that the telescoping movement of the propeller shaft is small. Even in this type of arrangement substantial shocks are transmitted through the propeller shaft to the bearings in the motor which tends to cause rapid destruction of the motor mechanism and require specially designed bearings to withstand the shocks. In road vehicles with tandem axles and more than four wheels, in addition to the movement of the axles with relation to the frame permitted by the spring deflections, a substantial oscillating movement of the axles is permitted. In this type of vehicle it has been proposed to mount electrical drive motors on the frame and to drive the axles with telescoping propeller shafts provided with universal joints in such a way that the arc of oscillation of the axles to be driven is opposite in curvature to the arc of oscillation of the propeller shaft as the vehicle passes over road irregularities. Due to the oscillating movement and swinging of the axles and the propeller shafts in opposite directions, a substantial amount of movement is introduced in the splined or telescopic propeller shaft connections which results in pounding and the transmission of heavy shocks and blows to the axle and motor bearings with the result that expensive motor and axle constructions must be utilized, the life of the mechanism is short, and the cost of maintenance and operation is excessive.

In the prior electrical drives for tandem drive axles torquing interconnections between the axles are provided which maintain the axles in alignment with each other so that as one axle shifts its position with respect to the frame, the other axle is also shifted increasing the propeller shaft angularity and the strains in the universal or flexible joints in the propeller shaft.

Accordingly an object of the present invention is to provide a combined torquing and electrical drive arrangement for road vehicles in which the propeller shaft spline travel and shocks transmitted to the mechanism are reduced to a minimum.

Another object of the invention is to provide electrical drive arrangements for single and multiple drive axle road vehicles in which the universal or flexible joints in the propeller shaft connection extending from a frame supported motor to the drive axle may be eliminated.

Further objects of the invention are to provide tandem axle drive and torquing arrangements in which the torque is resisted in a manner reducing to a minimum the variations in the angularity of the driving connections, and in which variations in the angularity of the propeller shaft caused by the effect of movement of the axles on each other due to torquing interconnections is eliminated.

Other objects of the invention are such as may be attained by a utilization of the various combinations, subcombinations and principles hereinafter more fully set forth and as defined by the scope of the appended claims.

Referring to the drawings,

Figure 1 is a side elevation partially in section of a preferred embodiment of the invention.

Figure 2 is a fragmental view showing a modified form of motor support.

Figure 3 is a side elevation partially in section of a further modification of the invention.

As shown in Figure 1, 1 and 2 represent the driving wheels of a motor vehicle which are driven by the pairs of axle shafts 3. Each pair of axle shafts 3 is driven by any well known type of differential mechanism supported in the axle housings 4. Depending from the axle housings 4 and adjacent the ends thereof are the spring supporting lugs 5 to which the rear eyes of the springs 6 are pivotally secured by means of the pins 7. The forward ends of the springs 6 are pivotally connected by means of pins 8 to suitable brackets 9 which in turn are secured to the frame side members 11 of a road vehicle. Supported on the mid portions of the springs 6 are the saddles 12 to which are pivotally secured by means of pins 13, the lower ends of the shackles or links 14, the upper ends of which are pivotally secured by means of the pins 15 to the ends of the equalizing members 16. Equalizing members 16 are trunnioned at their centers on trunnion pins 17 which are rigidly secured to the brackets 18. Brackets 18 are secured to and support the frame side members 11.

Supported from the frame side members 11 are the motor supporting brackets 19 in the lower ends of which the supporting trunnions 20 of the electrical drive motors 21 are journaled. Trunnions 20 as shown are in the horizontal plane of and close to the pins 8. Formed integrally with the casings of the motors 21 are the tubular torque resisting and guiding extensions 22 which telescope over tubular extensions 23 formed integrally with axle housings 4. The armature shafts of the motors 21 are connected to and drive the differential mechanisms for the axle shafts 3 by means of the propeller shafts 24 which are provided with suitable telescoping or splined joints of any well known construction to permit movement of the axles with relation to the frame supported motors as the springs deflect, but are not provided with universal joints.

In operation of this form of the invention, as the vehicle passes over road irregularities the axles will oscillate about pins 8 as axes and the motors 21 will oscillate about the trunnions 20 which may be at, or as shown substantially at, the axes of oscillation of the axles so that substantially no spline movement of the propeller shaft sections 24 will occur due to the oscillating movement of the axles. The propeller shaft sections 24 are held in alignment by the telescoping tubular members 22 and 23 which form extensible and contractible torque resisting constructions for the driving axles permitting movement of the axles toward and from the driving motors as the springs deflect, and provide casings between the motors and the axles which protect the driving shaft bearings and electrical connections from mud, water, and the like.

Instead of securing brackets 19 for the motors 21 rigidly to the frame, these brackets may be pivotally supported on vertical pivots 25 formed integrally with securing brackets 26 which are rigidly secured to the frame, (see Figure 2). In this form of support the motors are free to rotate about the pivots 25 to permit a slight rotation of the axles in a horizontal plane under road conditions.

In the form of invention shown in Figure 3 the differential springs 27 are supported intermediate their ends from the axle housings 4 by the supporting saddles 28. The adjacent ends of the springs 27 are pivotally connected by the pins 29 to the lower ends of links or shackles 30 which at their upper ends are connected by pins 31 to equalizing members 32 which are preferably leaf springs. Secured to the equalizing members 32 are supporting saddles 33 which are journaled on the trunnion pins 34 of the supporting brackets 35. Supporting brackets 35 are secured to the frame members 11. The opposite ends of springs 27 are secured by means of the pins 36 to suitable brackets 37 which are rigidly secured to and support the frame side members 11. Supported rigidly from the frame by the members 38 are the electrical drive motors 39, the drive shafts of which are connected by universal or flexible joints 40 to the propeller shaft sections 41. Universal joints 40 are in alignment or close to pins 36. Propeller shaft sections 41 are slidably splined to and telescope in the propeller shaft sections 42 which in turn are connected to and drive the differential mechanisms of the axles through the universal or flexible joints 43. Rigidly secured to the axle housings 4 are ends of trough shaped torque resisting and protecting members 44 which at their opposite ends are secured to rings 45. Rings 45 in turn are slidably seated on spherical shaped extensions 46 of the casings of motors 39 so that a limited universal movement of the members 44 with relation to the motor casings is permitted.

In operation of this form of the invention, the axles and propeller shaft will oscillate in substantially parallel arcs as the vehicle passes over road irregularities so that very little movement in the splined connection between the propeller shaft sections 41 and 42 will occur. Furthermore it will be noted that the torque resisting member 44 forms a protective casing member between the motor casings and the axles shielding the motors from water, mud and the like, and at the same time resists the torque reactions of the axles and tends to maintain the propeller shaft sections in alignment.

The form of invention shown in Figure 3 may be modified by eliminating the torque resisting members 44 and securing one of each pair of the saddles 28 rigidly to its axle 4 and journaling the other one of each pair on its axle so that torque reactions of the axles will be transmitted through the rigid saddles and resisted by the springs 27 secured thereto.

Having described preferred embodiments of the invention only, it will be seen by those skilled in the art that novel and useful torquing and driving arrangements are provided, the details of which may be varied widely without departing from the spirit of my invention which is limited only by the terms of the appended claims. Accordingly What is desired to be secured by Letters Patent and claimed as new is:

1. A motor vehicle comprising a frame, a driven axle, said axle being attached to said frame by longitudinally arranged springs that are pivoted at a fixed transverse line on said frame and that have portions connected to said axle, a motor pivoted to the frame on an axis that is approximately coincident with said line, and an extensible shaft for operatively coupling said motor and said axle, said shaft and said pivotal axis of the motor being substantially contained between the horizontal planes which bound the springs.

2. The combination defined in claim 1 including a torquing connection between said motor and the housing of the axle in the form of a housing surrounding the motor shaft, said torquing connection permitting slight movement of the axle toward the motor and unrestricted tilting of said axle and being rigid to forces tending to rotate the axle housing about the axle.

3. A motor vehicle comprising a frame, tandem driven shafts secured to springs pivoted to said frame on spaced fixed lines extending transversely of the frame, an equalizing member attached to the frame between said lines and shackles connecting said member and springs, a motor for each axle, each motor being pivoted to the frame to swing about an axis that is aproximately coincident with one of said lines, and an extensible drive shaft operatively connecting each motor to its axle.

4. The combination of claim 3 in which the motor shafts are surrounded with torquing connections extending from the motors to the housings of the axles, said torquing connections permitting movement of the axles toward and from each other and relative tilting movement of one axle relative to the other, but being rigid to torque tending to rotate the axle housings about the axles.

5. A road vehicle comprising a frame, a pair of axles arranged adjacent one end of said frame, a spring individual to each axle, each spring being pivotally connected to said frame, means connecting said springs together and to said frame so that each axle is free to swing substantially bodily relative to said frame about a transverse axis and independently of any change in the lengths of the springs due to deflection thereof, separate driving means for each axle each including elements between which pivotal movement can take place about an axis approximately in alinement with the axes of a corresponding one of the transverse spring pivots and substantially in the same horizontal plane therewith.

6. A road vehicle comprising a frame, a pair of axles arranged adjacent one end of said frame, a spring secured to each axle, each spring being pivoted to said frame at one end, one of said pivots being disposed between said axles so that the axles can move in parallel arcs with respect to said spring pivots, means interconnecting said springs and said frame so that each axle is free to swing substantially relative to said frame, a separate driving means for each axle, each driving means including a pivot that is approximately in transverse line with the spring pivots and substantially in the same horizontal plane therewith.

7. A motor vehicle comprising a frame, a driven axle, a spring directly pivoted at one end to said frame and connected adjacent its other end to said axle, means interconnecting the mid portion of said spring and said frame in a manner permitting substantial movement of said axle with respect to the pivot of said spring independent of any change in length of the spring due to deflection thereof, a motor pivoted to said frame for swinging movement about an axis approximately in transverse alinement with the axis of said spring pivot and an extensible drive shaft interconnecting said motor and said driven axle.

8. The combination defined in claim 7 in combination with a torque resisting connection between said motor and said axle, said torque resisting connection comprising telescopically disposed housings surrounding the drive shaft of said motor.

9. A motor vehicle comprising a frame, a driven axle attached to said frame by longitudinally arranged springs that are pivoted on said frame in a fixed line transverse thereto and connected to said axle at points spaced from said transverse line, longitudinally arranged driving means supported by said frame and projecting into connection with the driven axle, the longitudinal axes of said driving means and said springs being approximately in the same substantially horizontal plane, said driving means having a pivoted point located closely adjacent said fixed transverse line wherein the springs are pivoted to the frame and approximately within said horizontal plane, the springs and axle thereby being capable of appreciable vertical oscillation in substantially coincident arcs about said transverse line and said point without any substantial change in length of the springs.

10. In a motor vehicle construction, a frame, a driven axle, springs, each pivoted at one end to said frame in a line transverse thereto, means securing said axle to said springs at points spaced from said pivoted ends, means yieldably securing another point of each spring to the frame to permit oscillation of the axle and springs about the pivoted spring ends without any substantial change in length of the spring, and axle-driving means carried by the frame in approximately the same horizontal plane which includes the axle, said driving means including elements between which pivotal movement can take place about an axis approximately within said transverse line which includes the spring pivots.

11. In a motor vehicle construction, a frame, a pair of axles of which at least one is driven, a set of springs for each axle, each set having one end of each of its springs pivoted to said frame in a line transverse thereto, means securing each of said axles to its corresponding set of springs at points spaced from the pivoted spring ends, means supported by the frame and interconnecting the sets of springs, driving means carried by the frame and projecting into connection with said driven axle, the axis of said driving means being approximately coincident with the plane which includes the corresponding spring axes, said driving means including elements between which pivotal movement can take place about an axis approximately within said transverse line which includes the spring pivots, both of said axles thereby being capable of appreciable vertical oscillation without substantial changes in the lengths of the springs.

In testimony whereof I affix my signature.

ARTHUR I. MARCUM.